(12) United States Patent
Izumi et al.

(10) Patent No.: US 6,392,729 B1
(45) Date of Patent: May 21, 2002

(54) LIQUID CRYSTAL DISPLAY WITH BLACK MATRIX FORMED BY A BLACK RESIN OPTICAL SHIELDING LAYER AND A BLUE FILTER LAYER

(75) Inventors: Akiya Izumi, Mobara; Masao Yoshioka, Chiba; Tatsuo Hamamoto; Norimasa Akiyama, both of Mobara, all of (JP)

(73) Assignees: Hitachi, Ltd., Tokyo; Hitachi Device Engineering Co., Ltd., Mobara, both of (JP)

( * ) Notice: Subject to any disclaimer, the term of this patent is extended or adjusted under 35 U.S.C. 154(b) by 0 days.

(21) Appl. No.: 09/452,170

(22) Filed: Dec. 1, 1999

(30) Foreign Application Priority Data

Dec. 1, 1998 (JP) .......................................... 10-341884

(51) Int. Cl.[7] .............................................. G02F 1/1333
(52) U.S. Cl. ........................ 349/110; 349/106; 349/111
(58) Field of Search ................................ 349/110, 111, 349/106, 44

(56) References Cited

U.S. PATENT DOCUMENTS

| 5,877,830 A | | 3/1999 | Shimada et al. ............ 349/113 |
| 5,880,799 A | * | 3/1999 | Inoue et al. ................. 349/110 |
| 6,049,364 A | * | 4/2000 | Takahara et al. ............. 349/10 |

FOREIGN PATENT DOCUMENTS

JP          10-300919 A    *  11/1998

* cited by examiner

Primary Examiner—William L. Sikes
Assistant Examiner—Tarifur R. Chowdhury
(74) Attorney, Agent, or Firm—Antonelli, Terry, Stout & Kraus, LLP

(57) ABSTRACT

Disclosed are a liquid crystal display device capable of obtaining preferable display images, whose manufacturing cost is low, and which does not deteriorate the environment at the time of fabrication and a method for fabricating the same. According to the invention, there is provided a liquid crystal display device comprising: a first substrate on which a black matrix, a color filter, and a counter electrode are formed; a second substrate on which a plurality of gate signal lines and a plurality of source signal lines which are disposed so as to cross each other via a gate insulating film, thin film transistors disposed in intersecting points of the gate signal lines and the source signal lines, and pixel electrodes in a matrix disposed in the areas surrounded by the gate signal lines and the source signal lines are formed; and a liquid crystal layer provided between the first substrate and the second substrate, wherein the black matrix is formed by a black resin optical shielding layer and a blue filter layer. In a method for fabricating the liquid crystal display device according to the invention, the black matrix part formed by the blue filter layer is constructed by a photoresist film in which a blue pigment is dispersed and the photoresist film is patterned by using back side exposure.

5 Claims, 5 Drawing Sheets

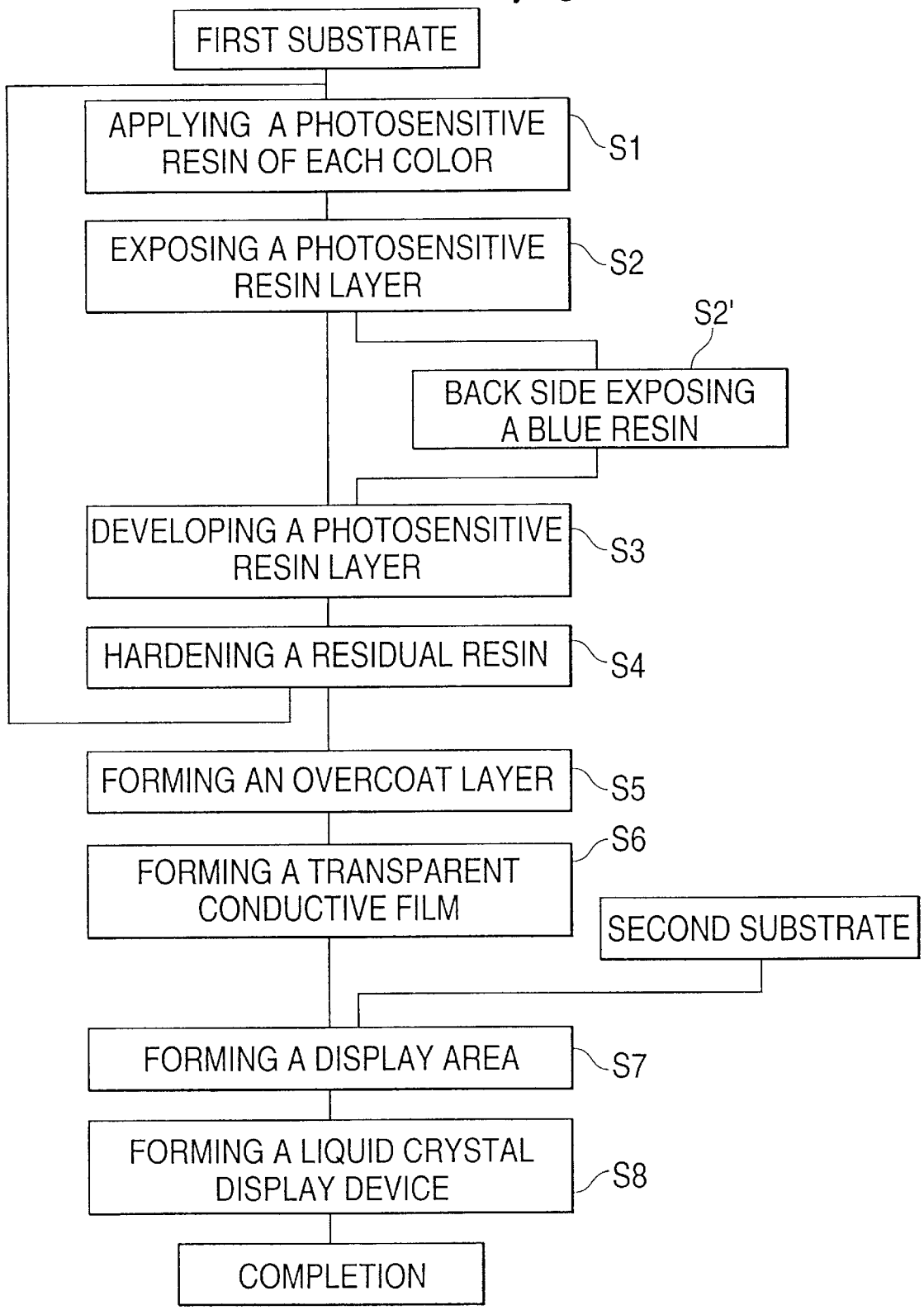

LIQUID CRYSTAL DISPLAY WITH BLACK MATRIX FORMED BY A BLACK RESIN OPTICAL SHIELDING LAYER AND A BLUE FILTER LAYER

BACKGROUND OF THE INVENTION

The present invention relates to a liquid crystal display device and a method for fabricating the same. More particularly, the invention relates to a liquid crystal display device and a method for fabricating the same which achieves a high aperture ratio by constructing a part of a black matrix by a color filter when the black matrix and a color filter are formed on a first substrate.

Generally, a liquid crystal display device is comprised of a first substrate and a second substrate which are disposed to face each other over a liquid crystal layer. On the first substrate, a black matrix, a color filter, a counter electrode, and the like are formed. On the second substrate, a plurality of gate signal lines and a plurality of source signal lines which are disposed so as to perpendicularly cross each other via a gate insulating layer, thin film transistors disposed at intersecting points of the plurality of gate signal lines and the plurality of source signal lines, pixel electrodes arranged in a matrix which are disposed in respective areas surrounded by the plurality of gate signal lines and the plurality of source signal lines, and the like are formed. The gate electrode of each thin film transistor is connected to the corresponding gate signal line, the source electrode is connected to the corresponding source signal line, and the drain electrode is connected to the corresponding pixel electrode.

In the liquid crystal display device, in order to increase the high brightness and good image quality of display pixels, there is an increasing demand of raising the aperture ratio of the liquid crystal display device, specifically, the aperture ratio indicative of the ratio between the pixel area and the pixel opening. Recently, for example, a liquid crystal display device having a high aperture ratio has been disclosed in U.S. Pat. No. 5,877,830 (cited document 1).

FIGS. 5A, 5B, and 5C show the configuration of the liquid crystal display device disclosed in the cited document 1. FIG. 5A is a plan view. FIG. 5B is a cross section taken along the line VB–VB' in FIG. 5A. FIG. 5C is a cross section taken along the line VC–VC' in FIG. 5A.

Shown in FIGS. 5A, 5B, and 5C are a first substrate (counter substrate) 51, a second substrate (active matrix substrate) 52, a liquid crystal layer 53, a black matrix (BM) 54, a color filter 55, a counter electrode 56, a first alignment layer 57, a gate signal line 58, a storage capacitor line 58f, a gate insulation layer 59, a thin film transistor (TFT) 60, a gate electrode 60G, a source electrode 60S, a drain electrode 60D, a source signal line 61, a transparent pixel electrode 62 formed by a transparent conductive layer (ITO), a contact hole 63, an insulating interlayer 64, a second alignment layer 65, a transparent conductive layer 66, and metal conductive layers 67a and 67b.

The liquid crystal display device shown in FIGS. 5A, 5B, and 5C is comprised of the first substrate 51 and the second substrate 52 arranged so as to face each other over the liquid crystal layer 53. On the first substrate 51, the black matrix 54, the color filter 55, the counter electrode 56 disposed opposite to the transparent pixel electrode 62, and the first alignment layer 57 are sequentially formed. On the second substrate 52, the plurality of gate signal lines 58 which are disposed in parallel and the plurality of storage capacitor lines 58f each of which is disposed between the neighboring gate signal lines 58 and 58 are formed. Further, the gate insulating layer 59, the thin film transistor 60, the insulating interlayer 64, the transparent pixel electrode 62, and the second alignment layer 65 are sequentially formed. The gate electrode 60G of the thin film transistor 60 is connected to the corresponding gate signal line 58 via the metal conductive layer 67a, the source electrode 60S is connected to the corresponding source signal line 61 via the metal conductive layer 67b, and the drain electrode 60D is connected to the corresponding storage capacitor line 58f via the transparent conductive layer 66 and also connected to the corresponding transparent pixel electrode 62 via the contact hole 63 formed in the insulating interlayer 64.

In the conventional liquid crystal display device having the configuration, the black matrix 54 formed on the first substrate 51 side covers only the peripheral part of the pixel area including the transparent pixel electrodes 62 arranged in a matrix on the second substrate 52 side and the area which is not covered with the black matrix 54 is used as an effective display area, so that a high aperture ratio is obtained.

In the conventional liquid crystal display device, the black matrix and the color filter are formed by a process as described below.

(1) First, a black matrix pattern is formed on a glass substrate by the photolithography method.

(2) For example, a pigment dispersed photosensitive resin for a green filter in which one of the three pigments constructing the color filter, for example, green pigment is dispersed is applied on the glass substrate.

(3) By using a mask for forming a green color filter, only an area in which the green color filter is to be formed on the glass substrate is irradiated with exposure light to expose the photosensitive resin layer for green filter in the area.

(4) A non-exposed area of the exposed photosensitive resin layer for green filter is removed by a developing process, thereby completing the formation of the green color filter.

(5) Then, for example, a pigment dispersed photosensitive resin for a red filter in which another one of the three pigments constructing the color filter, the red pigment, is dispersed is applied on the glass substrate on which the green color filter is formed.

(6) After that, by a process similar to the process of forming the green color filter, a red color filter is formed.

(7) A photosensitive resin for a blue filter, in which the last one of the three pigments of color filters, that is, blue pigment is dispersed is applied on the glass substrate on which the green and red color filters are formed.

(8) A blue color filter is formed by a process similar to that of forming the green color filter.

The liquid crystal display device disclosed in the cited document 1 has the following problems. Since the aperture ratio is specified by the gate signal lines 58 and the source signal lines 61 surrounding the transparent pixel electrodes 62, it is necessary to shield the area in which a thin film transistor is formed from incident light by using a metal mask newly formed via an organic insulating layer. Since the black matrix 54 is not disposed in the display area, the reflectance for ambient light increases and the contrast is lowered. Reflection light from the metal mask in the part in which the thin film transistor 60 is formed is observed from a gap of color patterns of the color filter 55 and displayed image non-uniformity such that an image changes irregularly according to a viewing angle occurs.

In a liquid crystal display device in which metal chromium (Cr) is used as a material of the black matrix, the manufacturing cost of the black matrix itself is as high as twice or more as compared with that of an ordinary black matrix using a black resin as a material of the black matrix. Consequently, there is a problem that the manufacturing cost of the liquid crystal display device is high.

On the other hand, in the case of a general color filter, although the black matrix using a black resin is cheap, not only the resolution of a display image is inferior, but also it is difficult to stably form the black matrix having a width of 10 μm or narrower. The minimum black matrix width which can be stably formed at present is about 20 μm.

SUMMARY OF THE INVENTION

It is therefore an object of the invention to provide a liquid crystal display device capable of obtaining a high aperture ratio with a simple configuration and a method of fabricating the same.

Another object of the invention is to provide a liquid crystal display device capable of obtaining a preferable image and a method of fabricating the same.

Further another object of the invention is to provide a liquid crystal display device which is fabricated at low cost and does not deteriorate the environment at the time of fabrication and a method of fabricating the same.

In order to achieve the objects, according to the invention, there is provided a liquid crystal display device comprising: a first substrate serving as a counter substrate; a second substrate serving as an active matrix substrate; and a liquid crystal layer provided between the first substrate and the second substrate, wherein a black matrix to be formed on the first substrate is constructed by a black resin optical shielding layer (black matrix film) and a blue filter layer.

According to the invention, there is provided a method for fabricating a liquid crystal display device, comprising: a first step of forming a black resin optical shielding layer in a predetermined part on the first substrate; a second step of sequentially forming a green filter layer and a red filter layer in predetermined parts on the first substrate; a third step of forming a photoresist film by applying a photoresist in which a pigment for forming the blue filter layer is dispersed on the first substrate; a fourth step of exposing the photoresist by irradiating the photoresist applied side with front side exposure light by using a photomask; a fifth step of exposing the photoresist by irradiating the front side of the first substrate which is opposite to the photoresist applied side with back side exposure light by using a frame-shaped photomask; and a sixth step of forming a blue filter layer by removing the non-exposed area of the photoresist.

In the liquid crystal display device according to the invention, the black matrix on a metal mask contributing to the aperture ratio of the liquid crystal display device is formed by the blue filter layer and the black matrix in the other part is formed by the black resin optical shielding layer. Consequently, the liquid crystal display device of a high aperture ratio with no deterioration in the image resolution can be obtained. Since the black resin optical shielding layer which is cheap is also used, the manufacturing cost can be suppressed to be low. Since no metal chromium is used, the environment is not deteriorated. Also in the case of using the blue filter layer as a material of the black matrix, reflection light from the metal mask can be sufficiently checked by the blue filter layer.

In the method for fabricating the liquid crystal display device, since both of the front side exposure and back side exposure are used at the time of forming the black matrix on the metal mask contributing to the aperture ratio of the liquid crystal display device by the blue filter layer, the blue filter layer constructing the color filter and the blue filter layer constructing the black matrix can be effectively formed. Simultaneously, the tolerance of optical leakage of the liquid crystal display device can be widened by a self alignment function.

Other objects, configurations, and effects of the invention will become more apparent as the following detailed description of embodiments proceeds.

BRIEF DESCRIPTION OF THE DRAWINGS

FIG. 3 is a flowchart showing an example of the fabricating process of the liquid crystal display device shown in FIG. 1.

DETAILED DESCRIPTION OF THE PREFERRED EMBODIMENTS

Figure 1:
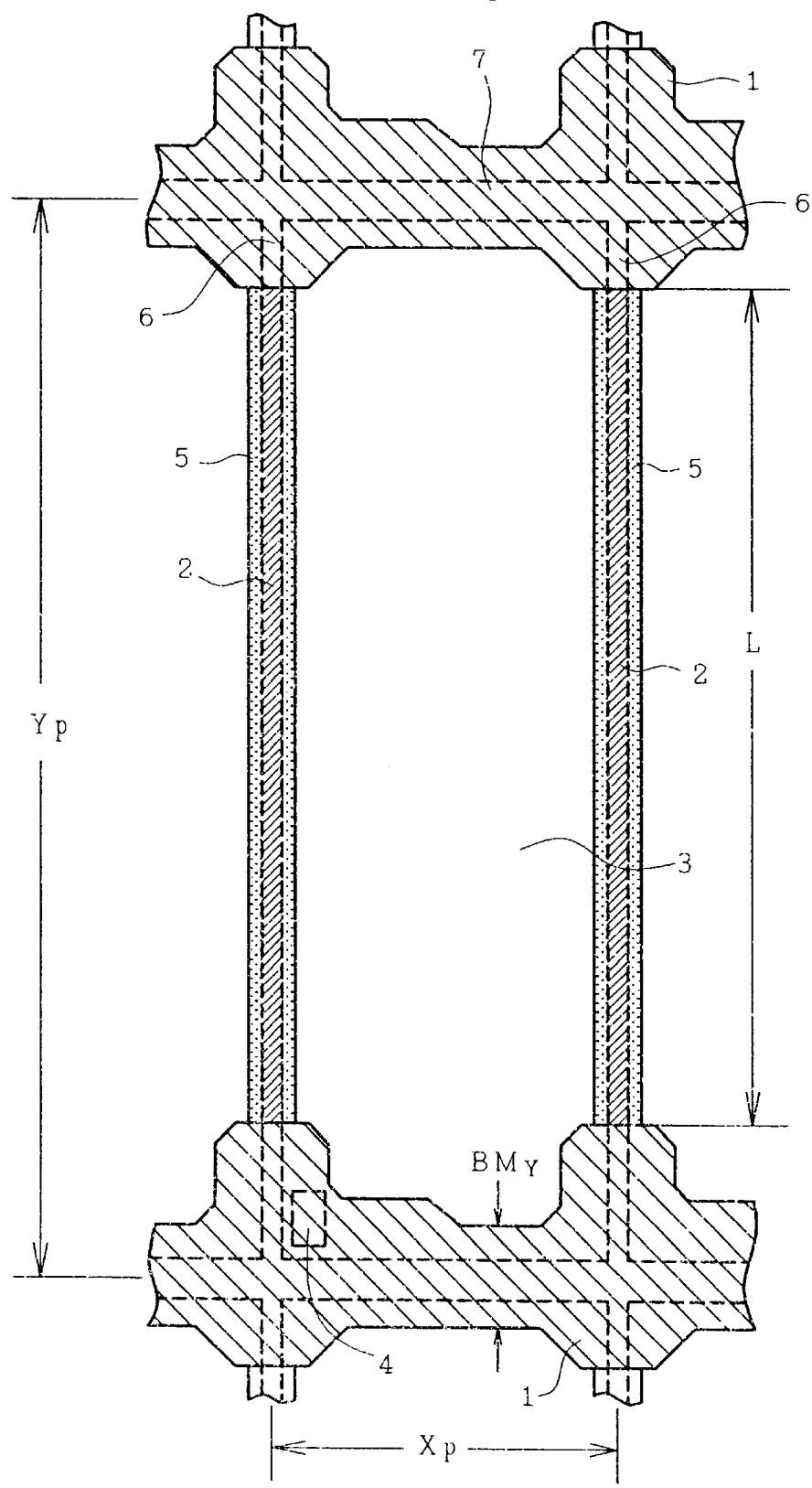
FIG. 1 is a partial plan view showing the configuration of a liquid crystal display device according to an embodiment of the invention.

In a first embodiment of the invention, there is provided a liquid crystal display device comprising at least: a first substrate on which a black matrix, a color filter, and a counter electrode are formed; a second substrate on which a plurality of gate signal lines and a plurality of source signal lines which are disposed so as to cross each other via a gate insulating film, thin film transistors disposed in intersecting points of the gate signal lines and the source signal lines, and pixel electrodes arranged in a matrix which are disposed in the areas surrounded by the gate signal lines and the source signal lines are formed; and a liquid crystal layer provided between the first substrate and the second substrate, wherein the black matrix is formed by a black resin optical shielding layer and a blue filter layer.

In the black matrix, parts overlapped with the plurality of source signal lines except for the intersecting point parts of the gate signal lines and the source signal lines are formed by the blue filter layer and the other part including the thin film transistor disposed part is formed by the black resin optical shielding layer.

According to a second embodiment of the invention, there is provided a method for fabricating a liquid crystal display device including a process of forming a black matrix and a color filter on a first substrate, the process comprising: a first step of forming a black resin optical shielding layer in a predetermined part on the first substrate; a second step of sequentially forming a green filter layer and a red filter layer in the predetermined part on the first substrate; a third step of applying a photoresist in which a pigment for a blue filter layer is dispersed on the whole surface of the first substrate; a fourth step of exposing the photoresist by irradiating the front side of the photoresist of the first substrate with front side exposure light by using a photomask; a fifth step of exposing the photoresist by irradiating the side opposite to the photoresist applied side of the first substrate with back side exposure light by using a frame-shaped photomask; and a sixth step of forming a blue filter layer by removing the non-exposed area of the photoresist.

The order of the fourth and fifth steps may be replaced with each other.

The fourth step may be omitted. After the third step, the fifth step may be immediately executed.

In the method for fabricating the liquid crystal display device, when the optical transmittance of the green filter layer is set to $T_G$, the optical transmittance of the red filter layer is set to $T_R$, and the optical transmittance in a spectral sensitivity range of the blue filter layer is set to $T_B$, it is more desirable to set a wavelength range of exposure light used at the time of back exposure in step 5 so that each of the ratio $T_B/T_G$ and the ratio $T_B/T_R$ is equal to 2 or higher.

According to the first embodiment of the invention, when the black matrix is formed, the black matrix part contributing to the aperture ratio of the liquid crystal display device is formed by the blue filter layer and the other black matrix part is formed by the black resin optical shielding layer. Consequently, the liquid crystal display device having a high aperture ratio can be obtained and the brightness or resolution of a display image is not deteriorated.

According to the first embodiment of the invention, the black matrix is formed by the black resin optical shielding layer and the blue filter layer, and metal chromium (Cr) is not used. The manufacturing cost of the liquid crystal display can be therefore suppressed and the ambient environment is not deteriorated by the manufacture.

According to the first embodiment of the invention, even when a part of the black matrix is formed by the blue filter layer, reflection light from the metal mask can be sufficiently checked by the blue filter layer. The black matrix part formed by the blue filter layer can achieve the function equivalent to that of the black matrix part formed by the black resin optical shielding layer under a predetermined condition.

According to the second embodiment of the invention, in the case of forming the black matrix by the black resin optical shielding layer and the blue filter layer, the black matrix part formed by the black resin optical shielding layer is fabricated by the same method as that of forming an ordinary black resin black matrix. The black matrix part made by the blue filter layer is formed simultaneously with the blue filter layer in the color filter by the exposure method using both of the front side exposure and the back side exposure. Consequently, without adding any special fabricating process, the black matrix part made by the blue filter layer can be formed efficiently.

According to the second embodiment of the invention, since the black matrix part made by the blue filter layer is formed by using the back side exposure, the tolerance of optical leakage of the liquid crystal display device can be widened by the self alignment function.

Embodiments of the invention will be described in detail hereinbelow with reference to the drawings.

FIG. 1 partially shows the configuration of a liquid crystal display device according to an embodiment of the invention. In FIG. 1, one pixel area of the liquid crystal display device is shown and the arrangement relation of the black matrix and the color filter on a first substrate is shown. The lateral direction of the paper face is set as the X direction and the vertical direction is set as the Y direction.

In FIG. 1, reference numeral 1 denotes a black matrix part made by a black resin optical shielding film, 2 a black matrix part made by a blue filter layer, 3 a color pattern of a color filter of one of three color filters, 4 a thin film transistor, 5 a metal mask, 6 a color pattern gap in the X direction, and 7 a color pattern gap in the Y direction.

The black matrix is comprised of the black resin optical shielding layer 1 and the blue filter layer 2. As illustrated in FIG. 1, the black matrix part in the area having the length L overlapped with the X-direction color pattern gap 6 is formed by the blue filter layer 2 and the black matrix part in the other area is formed by the black resin optical shielding film 1. The color pattern 3 is formed so that a part of it overlaps the black resin optical shielding film 1. The metal mask 5 is provided in a position overlapped with the X-direction color pattern gap 6. The X-direction color pattern gap 6 is provided between one color pattern 3 and another one color pattern 3 which is neighboring in the horizontal (X) direction. The Y-direction color pattern gap 7 is provided between one color pattern 3 and another color pattern 3 which is neighboring in the vertical (Y) direction. A stripe color pattern structure in which color patterns 3 are continuously provided in the vertical direction without interposing gaps 7 may be also used.

Although not shown in FIG. 1, the liquid crystal display device of the embodiment comprises the first substrate, the second substrate, and the liquid crystal layer interposed between the first and second substrates. On the first substrate, the black matrix, color filter, and counter electrode are formed. On the second substrate, the plurality of gate signal lines and the plurality of source signal lines which are disposed so as to cross each other via the gate insulating film, thin film transistors disposed in the intersecting point parts of the gate signal lines and the source signal lines, and the pixel electrodes in a matrix disposed in areas surrounded by the gate signal lines and the source signal lines are formed.

As a specific example of the liquid crystal display device in the embodiment, the displayed area size of the liquid crystal display part is 13.3 inches, the pixel pitch XP in the horizontal direction is 88 μm, the pixel pitch YP in the vertical direction is 264 μm, the minimum width BMY of the black matrix part 1 made of the black resin is 22 μm, the X-direction color pattern gap 6 is 4 μm, the length of the black matrix part 2 formed by the blue filter layer is 210 μm, and the width of the metal mask 5 is 9 μm.

FIGS. 2A, 2B, 2C, and 2D are schematic cross sections showing an example of the fabricating process of the black matrix part 2 made by the color filter and the blue filter layer in the liquid crystal display device of the embodiment.

In FIGS. 2A, 2B, 2C, and 2D, reference numeral 8 denotes a first substrate (glass substrate), 9G a green pattern, 9R a red pattern, 9B a blue pattern, 10B a blue photosensitive resin layer, 11 an exposure mask, and 12 exposure light. The same reference numerals are designated to the same components as those shown in FIG. 1.

By using FIGS. 2A to 2D, the process of fabricating the black matrix part 2 made by the color filter and the blue filter layer will now be described.

Figure 2A:
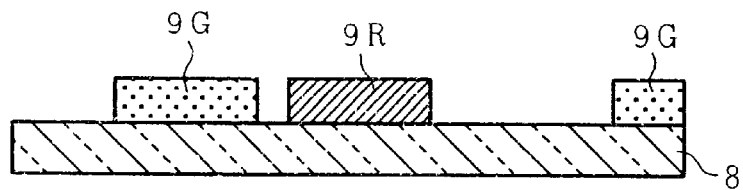
FIGS. 2A, 2B, 2C and 2D are schematic cross sections showing an example of a black matrix forming process in a process of fabricating the liquid crystal display device shown in FIG. 1.

First, as shown in FIG. 2A, the green pattern 9G is formed by a known fabricating process in a predetermined part on the first substrate 8 and the red pattern 9R is formed similarly by a known fabricating process.

Figure 2B:
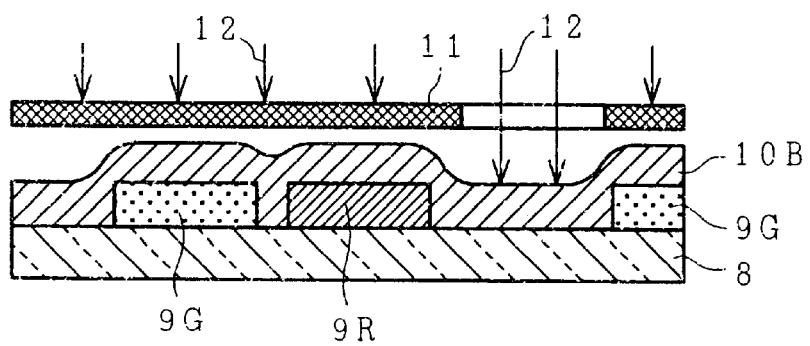

As shown in FIG. 2B, the blue photosensitive resin is applied on the first substrate 8 on which the green pattern 9G and the red pattern 9R are formed, thereby forming the blue photosensitive resin layer 10B. After that, the exposure mask 11 is placed on the blue photosensitive resin layer 10B, and the front side exposure is performed by irradiating the front side of the blue photosensitive resin layer 10B with the exposure light (ultraviolet rays) 12 through the exposure mask 11.

Figure 2C:
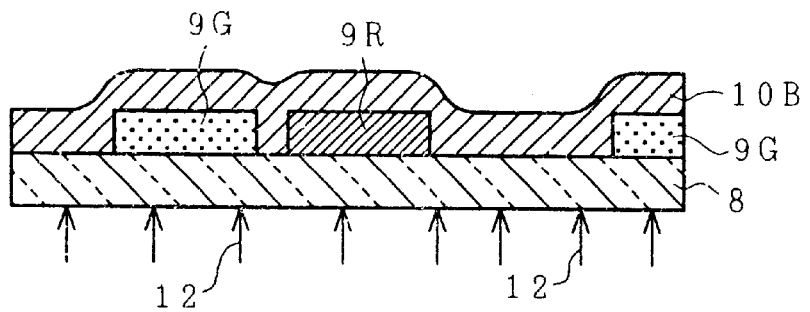

As shown in FIG. 2C, the back side exposure is performed by irradiating the blue photosensitive resin layer 10B from the back side of the first substrate 8 with the exposure light (ultraviolet rays) 12.

Figure 2D:
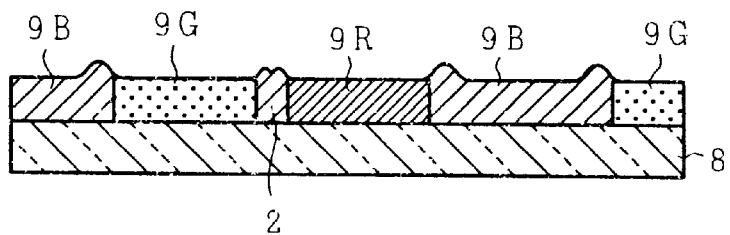

Subsequently, as illustrated in FIG. 2D, the blue photosensitive resin layer 10B which has been subjected to the front side exposure and the back side exposure is developed, and the non-exposed part of the blue photosensitive resin layer 10B is removed, thereby forming the black matrix part 2 made by the blue pattern 9B and the blue filter layer.

As described above, by performing both of the front side exposure and the back side exposure to the blue photosensitive resin layer 10B, the blue color pattern 9B in the color filter and the black matrix part 2 made by the blue filter layer can be simultaneously formed.

FIG. 3 is a flowchart showing an example of the fabricating process of the liquid crystal display device of the embodiment. By using FIG. 3, the process of fabricating the liquid crystal display device of the embodiment will be described.

First, in step S1, the black photosensitive resin as the material of the black matrix is applied on the first substrate (glass substrate) 8 by the spin coating method, thereby forming the black photosensitive resin layer.

In step S2, a glass substrate chromium mask for exposure is placed on the black photosensitive resin layer formed in step S1, and the black photosensitive resin layer is irradiated with exposure light through the mask to partially expose the black photosensitive resin layer.

In step S3, the black photosensitive resin layer partially exposed in step S2 is developed by using a developing solution. The non-exposed part is dissolved and removed and the black resin layer is allowed to remain only in a predetermined part and is dried.

In step S4, the black resin layer which is remained and dried in step S3 is heat hardened at the temperature of 200° C., thereby forming the black matrix part 1 made by. the black resin layer.

The program is returned to step S1 and the green photosensitive resin is applied on the first substrate 8 by the spin coating method to form the green photosensitive resin layer.

In step S2, the glass substrate chromium mask for exposure is placed on the green photosensitive resin layer and the green photosensitive resin layer is partially exposed with exposure light through the glass substrate chromium mask.

In step S3, the green photosensitive resin layer partially exposed is developed by using a developing solution. The non-exposed part is dissolved and removed and the green resin layer is allowed to remain only in a predetermined part and is dried.

In step S4, the green resin layer which is remained and dried is heat hardened at the temperature of 200° C., thereby forming the red pattern 9R.

After that, the program is again returned to step S1 and a blue photosensitive resin is applied on the first substrate 8 by the spin coating method, thereby forming the blue photosensitive resin layer 10B.

In step S2, the glass substrate chromium mask 11 for exposure is placed on the blue photosensitive resin layer 10B and the front side of the blue photosensitive resin layer 10B is partially exposed with exposure light 12 of an exposure amount rather smaller than that used for each of the green photosensitive resin layer and the red photosensitive resin layer through the glass substrate chromium mask 11.

Then the program moves to step S2' where the blue photosensitive resin layer 10B is partially irradiated with the exposure light 12 from the back side of the first substrate 8 without using the exposure mask while shielding the peripheral part except for the valid area by using a mask frame which is made of aluminum and is painted in black.

In step S3, the blue photosensitive resin layer 10B partially exposed is developed by using a developing solution. The non-exposed part is dissolved and removed and the blue photosensitive resin layer 10B is allowed to remain only in a predetermined part and is dried.

In step S4, the blue photosensitive resin layer 10B which is remained and dried is heat hardened at the temperature of 200° C., thereby simultaneously forming both of the blue pattern 9B and the black matrix part 2 made by the blue filter layer.

After that, the program moves to step S5 where the first substrate 8 is spin coated with a thermosetting overcoat resist to form an overcoat resist layer. By heating the overcoat resist layer, a thermoset overcoat layer is formed.

In step S6, a transparent conductive film (ITO film) is formed in a predetermined part on the first substrate 8 by a masked sputtering method. After that, the obtained first substrate 8 is tested, thereby completing the first substrate 8.

On the other hand, in parallel with the process of fabricating the first substrate 8, the second substrate on which various electrodes, various insulating films, thin film transistors and the like are disposed is formed by a known fabricating process. After that, the obtained second substrate is tested, thereby completing the second substrate.

In step S7, the first substrate 8 and the second substrate which have been completed are disposed so as to face each other with a space. A liquid crystal material is sealed in the space between the first substrate 8 and the second substrate, thereby forming a liquid crystal layer. For example, by adhering a polarizer film to each of the first substrate 8 and the second substrate, the liquid crystal display part is formed.

In step S8, a driving circuit for driving the liquid crystal display part and the like are mounted in the liquid crystal display part and module assembly is performed, thereby forming the liquid crystal display device. After that, the obtained liquid crystal display device is tested and completed.

Figure 4:
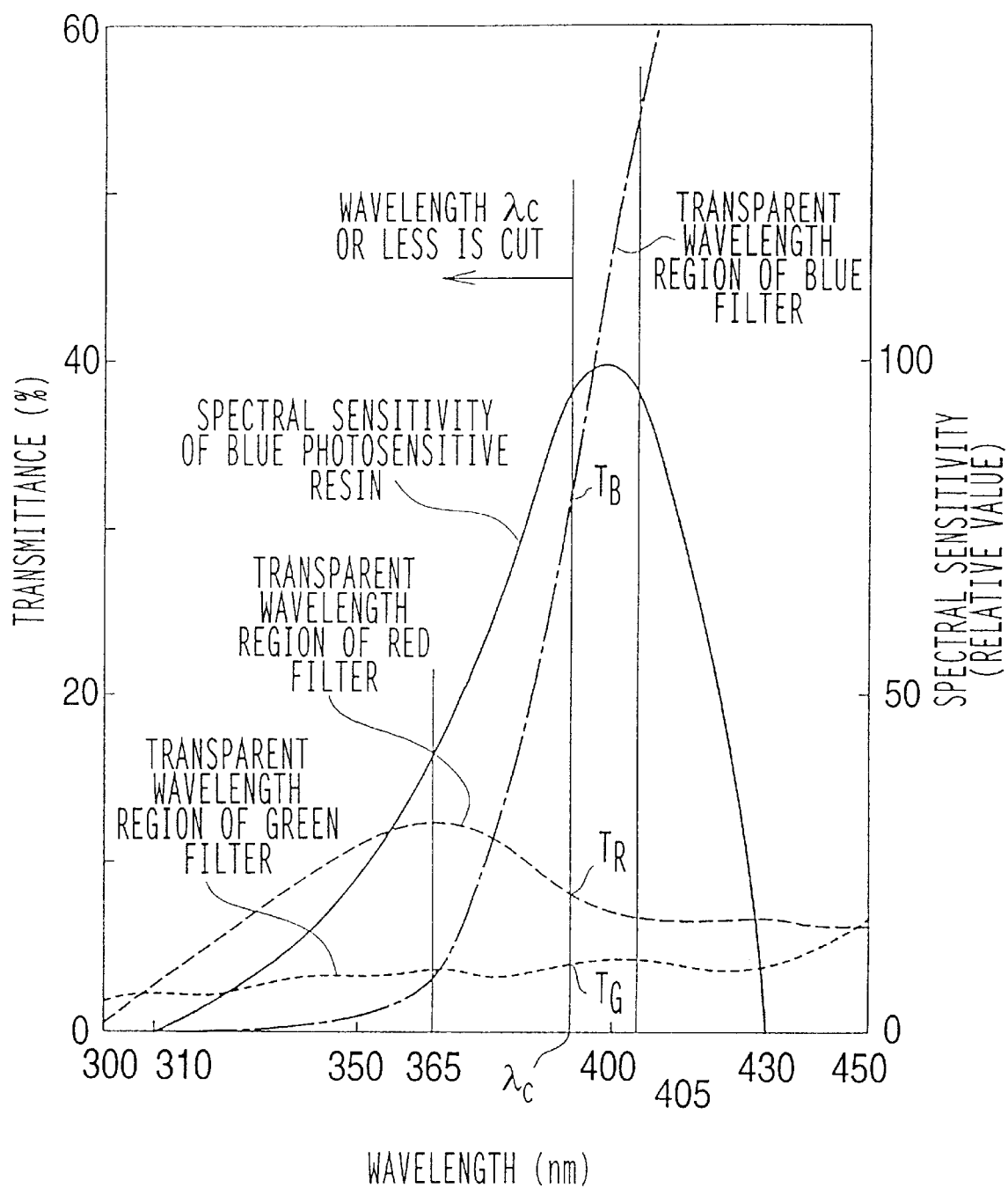
FIG. 4 is a graph showing the transparent wavelength region of a color filter including a blue filter layer in the liquid crystal display device shown in FIG. 1 and the latitude of cross-contamination in a process of forming a black matrix by the blue filter layer.
Figure 5B:
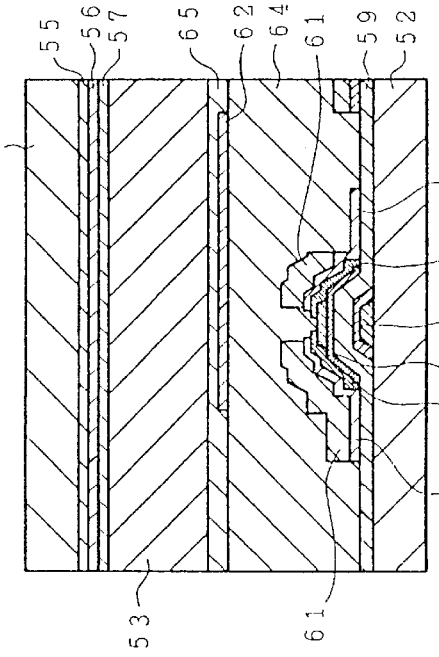
FIGS. 5A, 5B, and 5C are diagrams showing an example of the configuration of a conventional liquid crystal display device.
Figure 5C:
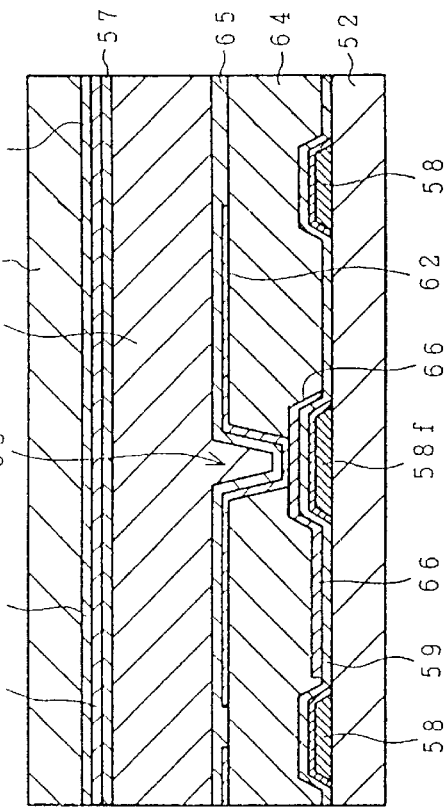
Figure 5A:
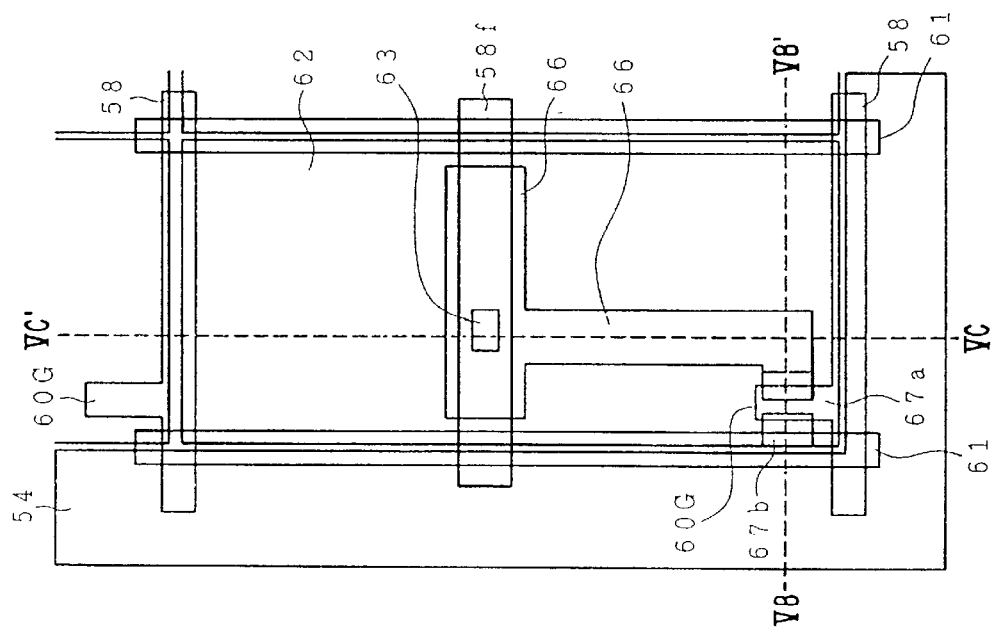

FIG. 4 shows the optical transmittance characteristics of the color filter including the blue filter layer 2 formed in the embodiment. In FIG. 4, the lateral axis denotes the wavelength in nm, the left side scale of the longitudinal axis shows the transmittance in % and the right side scale indicates the spectral sensitivity.

As shown in FIG. 4, when it is assumed that the optical transmittance of the blue pattern 9B and the blue filter layer 2 at a predetermined wavelength $\lambda C$ is TB, the optical transmittance of the red pattern 9R is TR, and the optical transmittance of the green pattern 9G is TG, the latitude of cross-contamination is expressed by (TB/TR) and (TB/TG). The larger each of the values is, the higher the latitude of cross-contamination is.

As shown in FIG. 4, at the wavelength of 365 nm which is the ordinary exposure light wavelength, each of (TB/TR)

and (TB/TG) is equal to 1 or less, and there is no latitude of cross-contamination. On the other hand, at the wavelength of 380 nm or higher at which the optical transmittance of the blue pattern 9B and the blue filter layer 2 sharply becomes higher, each of (TB/TR) and (TB/TG) becomes 1 or higher. With respect to h-rays (wavelength of 405 nm) as one of emission line spectrum of an extra-high pressure mercury lamp, each of (TB/TR) and (TB/TG) becomes 8 or higher and the sufficiently high latitude of cross-contamination can be obtained.

In order to obtain such sufficiently high latitude of cross-contamination, it is sufficient to cut light equal to or shorter than i-rays (wavelength of 365 nm) by using a cut filter and perform exposure by using light within the spectral sensitivity area of the blue photosensitive resin layer 10B, that is, light having the wavelength longer than λC and shorter than 430 nm. The light wavelength λC has to be set so that the latitude of cross-contamination is 2 or higher, preferably, 4 or higher. In the example shown in FIG. 4, when the exposure light is emitted through a cut filter for cutting light shorter than 390~400 nm in wavelength, the maximum latitude of cross-contamination can be obtained and a sufficient latitude of processing can be assured.

As described above, according to the liquid crystal display device of the embodiment, the black matrix is formed by the black resin layer and the blue filter layer, and metal chromium (Cr) is not used. Consequently, the cost of the liquid crystal display device can be made low and the manufacture does not deteriorate the environment.

In the liquid crystal display device of the embodiment, since the black matrix in the part which exerts an influence on the aperture ratio of the liquid crystal display device is constructed by the blue filter layer which can be formed narrower than the black resin layer and the black matrix in the other part is made of the black resin, the liquid crystal display device of a high aperture ratio can be obtained and the brightness or resolution of the display image is not deteriorated.

Further, in the liquid crystal display device of the embodiment, as a measure to improve the shielding performance in the part where the black matrix constructed by the blue filter layer is formed, it is sufficient to eliminate the metallic gloss of the metal mask by cutting the reflection light from the surface of the metal mask on the thin film transistor side. By using the blue filter layer having the transmission confirming to visual sensitivity which is the lowest among the three colors, sufficient optical shielding characteristics can be obtained.

In the embodiment, the example of forming the blue color pattern in the color filter and the blue filter layer constructing the black matrix by both of the front side exposure and the back side exposure has been described above. The method for forming the blue color pattern in the color filter and the blue filter layer constructing the black matrix in the invention is not limited to the method using both of the front side exposure and the back side exposure. For example, only by the back side exposure, the blue color pattern in the color filter and the blue filter layer constructing the black matrix may be also simultaneously formed. By using such a forming method, the exposure process can be more simplified (alignment is made unnecessary) and it is sufficient to dispose only one exposing apparatus. Consequently, increase in cost of the manufacturing equipment can be prevented.

On the other hand, according to the method for fabricating the liquid crystal display device of the embodiment, not only the ordinary front side exposure but also the back side exposure are used. The blue color pattern is formed by the front side exposure and the blue filter layer is formed by the back side exposure between the green pattern, red pattern, and blue pattern. Consequently, the blue pattern in the color filter and the blue filter layer can be simultaneously formed, so that the fabricating process can be made simpler.

According to the method for fabricating the liquid crystal display device of the embodiment, since the blue filter layer is formed by the back side exposure, the self alignment function is obtained and the tolerance of optical leakage can be enlarged. The tolerance of alignment of the color pattern is usually determined by the tolerance of optical leakage and the tolerance of overlapping. In the case of the self alignment, it is sufficient to pay attention only to the tolerance of overlapping, so that the tolerance of alignment can be enlarged to twice. That is, the tolerance of alignment can be enlarged from, for example, 2 μm to 4 μm. This is a big advantage when the liquid crystal display device is fabricated.

As described in detail above, according to the invention, in the case of forming the black matrix in the liquid crystal display device, the black matrix part on the metal mask contributing to the aperture ratio of the liquid crystal display device is formed by the blue filter layer and the black matrix in the other part is formed by the black resin layer. Consequently, effects such that the liquid crystal display device can have a high aperture ratio and the brightness or resolution of an image is not deteriorated can be produced.

According to the invention, the black matrix of the liquid crystal display device is formed by the black resin layer and the blue filter layer and no metal chromium (Cr) is used. Consequently, effects such that the manufacturing cost of the liquid crystal display device can be reduced and the environment is not deteriorated can be obtained.

Further, according to the invention, the black matrix of the liquid crystal display device is formed by the blue filter layer. Reflection light from the metal mask can be sufficiently checked by the blue filter layer. An effect such that a function equivalent to that of an ordinary black matrix can be achieved under predetermined conditions can be obtained.

In the method for fabricating the liquid crystal display device according to the invention, in the case of forming the black matrix made by the black resin and the blue filter layer, the black matrix part formed by the black resin layer is formed by the same method as that for forming the ordinary black resin black matrix. The black matrix part made by the blue filter layer is formed by the exposure method using the back side exposure at the time of forming the blue filter layer in the color filter, thereby forming the black matrix part simultaneously with the blue filter layer in the color filter. Consequently, it is unnecessary to add a special fabricating process and an effect such that the black matrix part made by the blue filter layer can be efficiently formed is produced.

What is claimed is:

1. A liquid crystal display device comprising:
    a first substrate on which a black matrix, a color filter, and a counter electrode are formed;
    a second substrate on which a plurality of gate signal lines and a plurality of source signal lines which are disposed so as to cross each other via a gate insulating film, thin film transistors disposed in intersecting points of the gate signal lines and the source signal lines, and pixel electrodes in a matrix disposed in the areas surrounded by the gate signal lines and the source signal lines are formed; and a liquid crystal layer provided between the first substrate and the second substrate, wherein the black matrix is formed by a black resin optical shielding layer and a blue filter layer.

2. A liquid crystal display device according to claim 1, wherein in the black matrix, parts overlapped with the plurality of source signal lines except for the intersecting point parts of the gate signal lines and the source signal lines are formed by the blue filter layer and the other part including the thin film transistor disposed part is formed by the black resin optical shielding layer.

3. A liquid crystal display device comprising:

a first substrate having formed thereon a black matrix, a color filter, and a counter electrode;

a second substrate having formed thereon a plurality of gate signal lines, a plurality of source signal lines which cross the gate signal lines, a gate insulating film disposed between the gate signal lines and the source signal lines, thin film transistors disposed in regions where the gate signal lines and the source signal lines intersect, and a matrix of pixel electrodes, the pixel electrodes being disposed in areas surrounded by the gate signal lines and the source signal lines; and a liquid crystal layer disposed between the first substrate and the second substrate;

wherein a first part of the black matrix which overlaps at least portions of the source signal lines is formed by a blue filter layer; and wherein a second part of the black matrix which overlaps the thin film transistors is formed by a black resin optical shielding layer.

4. A liquid crystal display device comprising:

a first substrate having formed thereon a black matrix, a color filter, and a counter electrode;

a second substrate having formed thereon a plurality of gate signal lines, a plurality of source signal lines which cross the gate signal lines, a gate insulating film disposed between the gate signal lines and the source signal lines, thin film transistors disposed in regions where the gate signal lines and the source signal lines intersect, and a matrix of pixel electrodes, the pixel electrodes being disposed in areas surrounded by the gate signal lines and the source signal lines; and a liquid crystal layer disposed between the first substrate and the second substrate;

wherein the black matrix is formed by a black resin optical shielding layer and a blue filter layer;

wherein a part of the black matrix which overlaps portions of the source signal lines outside the regions where the gate signal lines and the source signal lines intersect is formed by the blue filter layer; and wherein a remaining part of the black matrix including a part of the black matrix which overlaps the thin film transistors is formed by the black resin optical shielding layer.

5. A liquid crystal display device comprising:

a first substrate having formed thereon an optical shielding layer, a color filter, and a counter electrode;

a second substrate having formed thereon a plurality of gate signal lines, a plurality of source signal lines which cross the gate signal lines, a gate insulating film disposed between the gate signal lines and the source signal lines, thin film transistors disposed in regions where the gate signal lines and the source signal lines intersect, and a matrix of pixel electrodes, the pixel electrodes being disposed in areas surrounded by the gate signal lines and the source signal lines; and a liquid crystal layer disposed between the first substrate and the second substrate;

wherein the optical shielding layer is formed by a black resin layer and a blue filter layer;

wherein a part of the optical shielding layer which overlaps portions of the source signal lines outside the regions where the gate signal lines and the source signal lines intersect is formed by the blue filter layer; and wherein a remaining part of the optical shielding layer including a part of the optical shielding layer which overlaps the thin film transistors is formed by the black resin layer.

* * * * *